Dec. 19, 1950    M. A. SCHULTZ ET AL    2,534,929
BEARING
Filed April 22, 1946

WITNESSES:

INVENTORS
Mortimer A. Schultz &
Claude M. Skinner, Jr.
BY
Paul E. Friedemann
ATTORNEY

UNITED STATES PATENT OFFICE 2,534,929

BEARING

Mortimer A. Schultz, Baltimore, and Claude M. Skinner, Jr., Catonsville, Md., assignors to Westinghouse Electric Corporation, East Pittsburgh, Pa., a corporation of Pennsylvania Application April 22, 1946, Serial No. 663,914

3 Claims. (Cl. 308—188)

Our invention relates to antifriction bearings and has for its main object to devise a bearing which has an extremely low frictional drag together with a permanent magnetic and electric insulation between the supporting and journalled parts to be engaged by the bearing.

In an electrical apparatus and instruments, it is often desired to journal a rotatable member in such a manner that the torque required for turning the member is extremely small and not affected by changes in magnetic condition of the bearing structure. For instance, the rotatable deflection coil of a cathode-ray tube in the "Plan Position Indicator" of radar equipment should be carried by such a bearing in order to maintain the power required for rotating the coil at a minimum, thereby permitting the use of an appertaining electric control system of correspondingly small size. In the past, ball bearings with de-magnetized steel balls have been used for such purposes. But such bearings tend to become magnetized and are then apt to cause inaccurate indications due to magnetic effects. It is, therefore, a more specific object of the invention to provide an antifriction bearing that prevents the occurrence of such detrimental magnetic changes.

According to our invention, we provide an antifriction bearing with bearing bodies, i. e., rollers or balls, of a hard vitreous material, such as tempered heat-resisting type glass, which are accurately ground and lapped by optical manufacturing methods; and we associate these vitreous bodies with bearing races of non-magnetic material, preferably of a hardness over 40 C. scale Rockwell, such as beryllium copper. The vitreous bearing bodies may consist of tempered soda-alumina-borosilicate glass.

Figure 1:
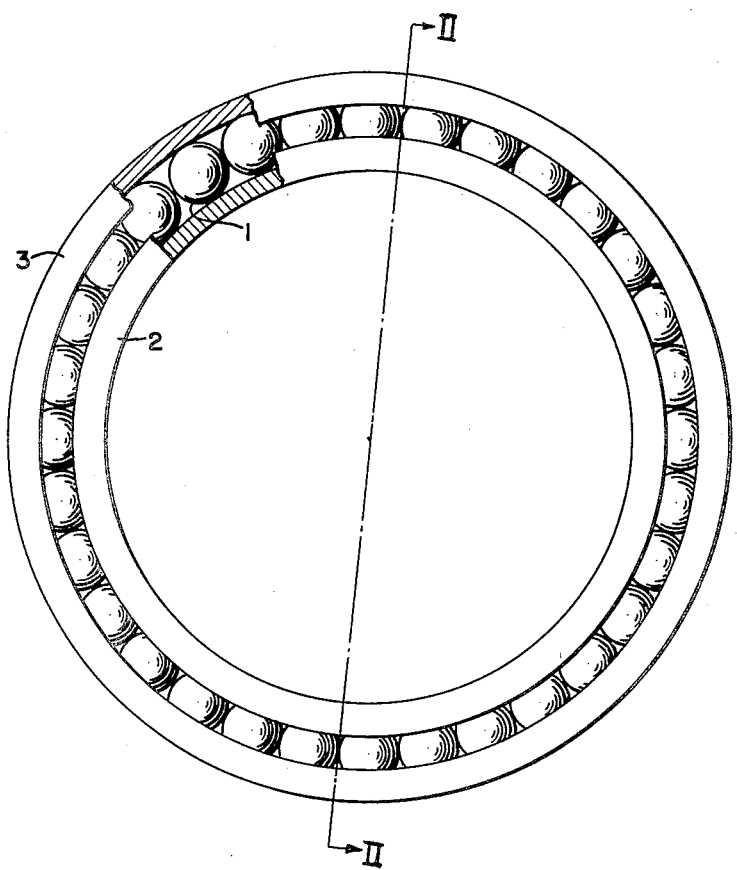
Figure 2:
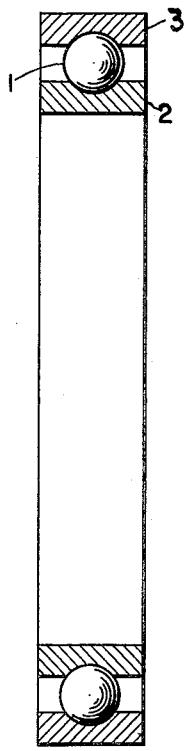

A bearing of this kind is exemplified by the drawing, showing in Fig. 1 a part-sectional axial view, and in Fig. 2 a section through the plane denoted in Fig. 1 by II—II. The bearing balls, such as those denoted by 1, consist of tempered glass of the heat resistant type ground and polished with optical accuracy, while the races 2 and 3 are machined from a hard and non-magnetic beryllium copper alloy. If desired, a different non-magnetic material may be employed for the races. For instance, the races may be machined from brass, and the race surfaces may then be hardened by electrolytic deposition of chromium. It will be understood that other known designs of ball and roller bearings may be applied in conjunction with the invention depending upon the desiderata of particular applications.

Bearings according to the invention are completely and permanently non-magnetic and hence will not cause a stray field. The electrical loading of a deflection coil or other electric circuit device journalled by means of such a bearing, as far as such loading is due to hysteresis and eddy current losses in the bearing races and bodies, is considerably reduced as compared with the bearings heretofore available. The vitreous bodies provide an electric insulation between inner and outer races and hence afford a simplification or omission of other insulating means usually employed in the type of apparatus above-referred to.

Another advantage of bearings according to the invention lies in the fact that its frictional drag is of extremely small magnitude. For instance, the frictional drag of the glass balls on beryllium-copper races as described above is approximately one-half of the drag occurring in comparable steel ball bearings; and such bearings according to the invention may be run at low speeds under light load without lubrication.

What we claim as our invention is:

1. A completely non-magnetic antifriction bearing, comprising inner and outer race members both consisting of non-magnetic metal throughout and having a hardness above 40 C scale Rockwell, and ground and lapped bearing balls of tempered heat-resistant type glass disposed between said race members and electrically insulating them from each other.

2. A completely non-magnetic antifriction bearing, comprising inner and outer race members of non-magnetic beryllium-copper of a hardness above 40 C scale Rockwell, and ground bearing balls of tempered soda-alumina-borosilicate glass disposed between said race members and electrically insulating them from each other.

3. A completely non-magnetic antifriction bearing, comprising inner and outer race members of beryllium-copper of a hardness above 40 C scale Rockwell and bearing balls of tempered heat-resistant type soda-alumina-borosilicate glass disposed between said race members so as to electrically insulate them from each other.

MORTIMER A. SCHULTZ.
CLAUDE M. SKINNER, JR.

REFERENCES CITED

The following references are of record in the file of this patent:

UNITED STATES PATENTS

| Number | Name | Date |
|---|---|---|
| 1,631,763 | Rouanet | June 7, 1927 |
| 2,158,156 | Schroder | May 16, 1939 |